UNITED STATES PATENT OFFICE.

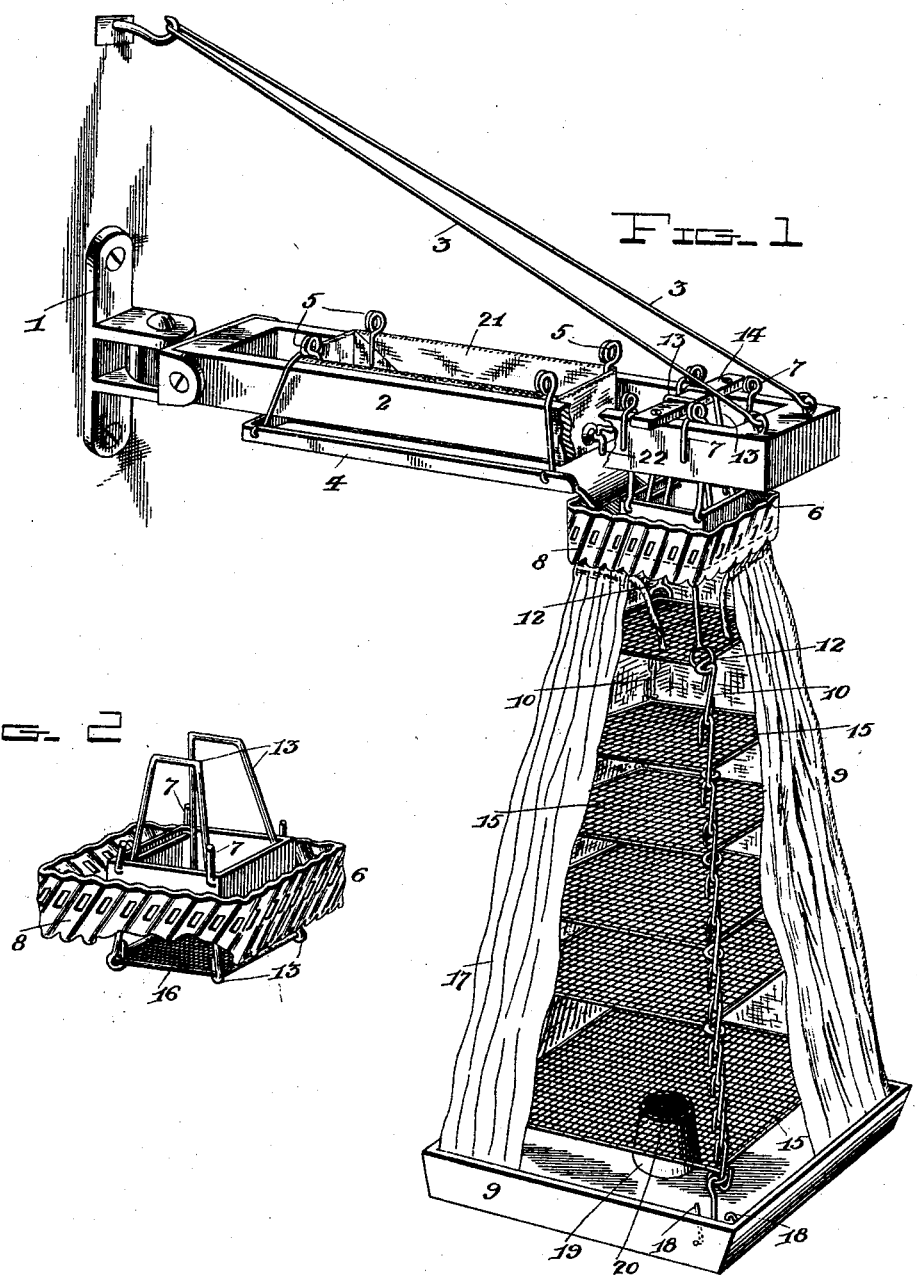

MARK L. COWAN, OF EDDY, TEXAS.

MILK-COOLER.

SPECIFICATION forming part of Letters Patent No. 633,261, dated September 19, 1899.

Application filed February 21, 1899. Serial No. 706,338. (No model.)

*To all whom it may concern:*

Be it known that I, MARK L. COWAN, a citizen of the United States, residing at Eddy, in the county of McLennan and State of Texas, have invented certain new and useful Improvements in Milk-Coolers; and I do declare the following to be a full, clear, and exact description of the invention, such as will enable others skilled in the art to which it appertains to make and use the same.

My invention relates to improvements in milk-coolers, and more particularly to that class of combined coolers and aerators in which advantage is taken of the principle of reducing the temperature of the contents of the cooler due to the evaporation of water; and the object is to provide a simple, inexpensive, and effective device of this character.

To these ends the invention consists in the construction, combination, and arrangement of the device, as will be hereinafter more fully described, and particularly pointed out in the appended claims.

It is a well-known fact that fresh milk contains animal heat, also that in the subsequent changes milk undergoes there are gases being constantly thrown off and that in order to free it from this heat and gas the milk should be kept in open vessels, also that milk and butter are exceedingly susceptible of and quickly contaminated by other odoriferous substances or gases. It is also well known that in warm dry weather by placing in a current of air a vessel surrounded by a wet cloth the evaporation of the water in the cloth causes the contents of the vessel to become very much cooler than the surrounding atmosphere. I attain these objects by constructing at a very small cost a cool, clean, airy, and convenient receptacle or repository for the uncovered milk vessels, whereby the milk and butter may be freed from the odors and gases and kept pure, cool, and healthful in the following manner: first, having an adjustable repository made of a material that is not susceptible of absorbing and does not contain, emit, or reflect gases or odors, the repository to be sufficiently closed to exclude dust and insects; second, having a means of aerifying the water, thereby cooling and freeing the water from any unhealthy or unpleasant odors before passing to evaporation or coming in proximity to the milk vessels; third, having the most perfect means to control and regulate the distribution of water, so as to obtain the greatest amount of evaporation, hence securing the lowest temperature in repository; fourth, having a cooler that will occupy a small space; fifth, having a cooler that is convenient and easy of access; sixth, having a cooler that can be easily and quickly separated in parts and packed in small space for transportation or storage, and, seventh, having a cooler that is durable and can be constructed at small cost.

In the accompanying drawings the same reference characters indicate the same parts of the invention.

Figure 1 is a perspective view, partly in section, of my improved milk-cooler. Fig. 2 is a detail view of the water-distributing pan.

In the drawings, 1 denotes a bracket which is fixed at a convenient height to the outside of the wall of a building or other suitable support. 2 denotes a horizontal frame pivoted at one end in said bracket, and from the outer end of the frame suitable guy-wires 3 3 extend to an eyebolt fixed in the wall above said bracket.

4 denotes a drip-pan removably secured to the frame 2 by the spring-clips 5 5, and the forward lower end of this drip-pan extends into the water-distributing pan 6, which is likewise suspended from the frame by the clips 7 7. This pan 6 is preferably rectangular in form and consists of an imperforate bottom and inner flange and a diagonally fluted and perforated outer flange 8, and below this pan is suspended the cooler proper, which consists of a rectangular pan 9, which is suspended by the open-link chains 10 10 to the diverging rods 12-12, connected to the yokes 13 13, depending from the cross-bar 14, secured to the frame 2.

15 15 denote a series of horizontal reticulated shelves adjustably secured to the chains 10 10, the adjustment being attained by removing or inserting a link or two in the chains between the shelves.

16 denotes a fine-wire-gauze diaphragm fixed in the upper ends of the rods 12 12, and 17 denotes a curtain provided with a drawstring at upper end to removably secure it around the cooler proper, its vertical parallel edges being arranged to overlap and to be removably secured in place by engagement with the hooks 18 18.

The center of the pan 9 is provided with a ventilating-tube 19, having a wire-gauze diaphragm 20 to permit free circulation of air and prevent the entrance of foreign matter, insects, and the like into the cooler.

21 represents the water-reservoir, and it consists of a rectangular piece of sail-cloth or heavy cotton duck, which is folded at the corners to form a box-like receptacle with four vertical parallel walls, which are supported in the frame 2 by the spring-clips 5 5 above the drip-pan 4. The forward wall of this reservoir is provided with a faucet 22 to regulate the supply of water to the distributing-pan 6. When the water is placed in the cotton reservoir, the fabric swells and becomes practically water-tight, any seeping or leakage being caught by the drip-pan and conducted to the distributing-pan, whence it is discharged through the orifices therein and falls upon the curtain, when it evaporates and carries off the heat contained in the articles placed in the cooler.

The accompanying drawings show my invention in the best form now known to me; but many changes in the details might be made within the skill of a good mechanic without departing from the spirit of my invention as set forth in the claims at the end of this specification.

Having thus described my invention, what I claim, and desire to secure by Letters Patent, is—

1. A milk-cooler comprising the frame, the water-reservoir, the drip-pan and the orificed distributing-pan, the supporting-chains consisting of a series of open links, the pan 9, and the reticulated shelves carried by said chains, and the encompassing curtain substantially as shown and described.

2. In a milk-cooler of the class described, the frame, the distributing-pan, the flexible water-reservoir, and the drip-pan opening into the distributing-pan, a series of superimposed reticulated shelves suspended from said frame beneath the distributing-pan, and the curtain encompassing said shelves, substantially as shown and described.

In testimony whereof I have hereunto set my hand in presence of two subscribing witnesses.

MARK L. COWAN.

Witnesses:
 R. HAYNE KING,
 CLYDE BURNS.